T. J. Mayall.
Stone Pavement.
N° 30,417.   Patented Oct. 16, 1860.

Witnesses:
Joseph Gavett
Albert W. Brown

Inventor:
Thos. J. Mayall

UNITED STATES PATENT OFFICE.

THOS. J. MAYALL, OF ROXBURY, MASSACHUSETTS.

MANUFACTURE OF TILE FOR FLOORING.

Specification of Letters Patent No. 30,417, dated October 16, 1860.

*To all whom it may concern:*

Be it known that I, THOMAS J. MAYALL, of Roxbury, in the county of Norfolk and State of Massachusetts, have invented a certain new and Improved Manufacture of Tiles or Slabs for Floors, &c; and I do hereby declare that the following description, taken in connection with the accompanying drawings, hereinafter referred to, forms a full and exact specification of the same, wherein I have set forth the nature and principles of my invention, by which it may be distinguished from all others of a similar class, together with such parts as I claim and desire to have secured to me by Letters Patent.

The figures of the accompanying plate of drawings represent a diagram of tiles or slabs illustrative of my improvements.

Figure 1:
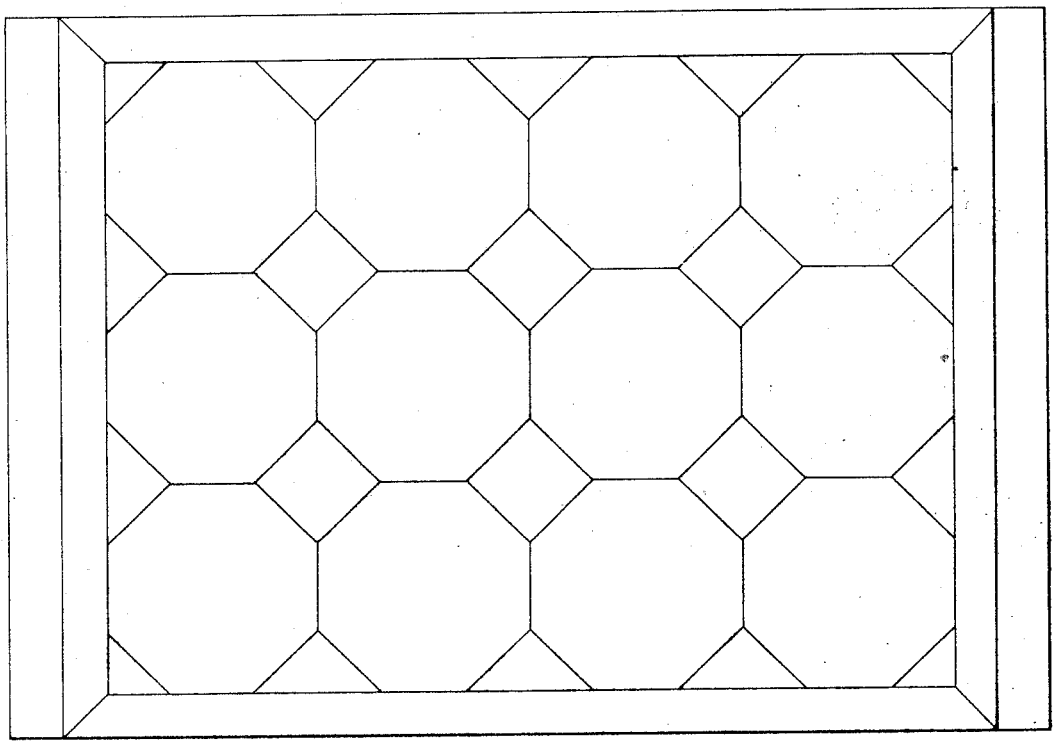
Figure 2:

Figure 1 is a plan or top view of my improved tiling. Fig. 2 is a vertical section of the same.

The tiles heretofore in common use have been generally made of marble or other stone or slate and their great cost has prevented their being generally employed for floorings &c. The present invention consists in forming a cheap and durable substitute for stone tiles, which is softer to tread upon and prevents the liability of a person's slipping thereon and makes no noise when walked upon. I effect these results by making the tiles of a composition of india-rubber or gutta-percha and sulfur, made into sheets and then heated and afterward cut out in the desired size and shape by dies or knives, or molded in proper molds. I take three pounds of sulfur and twelve pounds of rubber or gutta-percha rags or trimmings, well known by rubber manufacturers, and mix them thoroughly together in the usual mode by grinding them between hot rollers. The composition is then formed into sheets of any desired thickness by being passed between calender rolls. These sheets are then heated from one to six hours between metallic plates at a temperature of from 230° to 280° Fahrenheit, or they may be subjected to strong pressure, between metallic plates heated by a steam-jacket in which case the curing will be effected in less time, say from fifteen minutes to four hours, varying according to the pressure of steam used. The sheets of the composition are then cut into any of the shapes in which tiles are usually made by dies or knives, or they may be pressed into molds or dies of the desired form.

The tiles thus produced are possessed with peculiar elasticity or softness which resembles that of rich carpets whereby not only is a flooring produced that is very pleasant to walk upon but is also noiseless and almost incapable of wear.

As it is evident that any of the well known compounds made by rubber manufacturers, into which other ingredients than those above stated enter, may answer the purposes of my invention, I shall not confine myself in my claim to the use of the substances I have mentioned or to the exact proportions in which they are combined, although I prefer the composition described, as it can be made at a very small cost.

It will be obvious that the composition can be made white, black or of any desired color by the well-known modes usually practiced in the rubber manufacture.

Having thus described my improvements what I claim as my invention, and desire to secure by Letters Patent, is—

The new manufacture of tiles or slabs for flooring, the same consisting of india rubber or gutta-percha composition, which when combined with various coloring ingredients, made into sheets of suitable thickness, cut or molded into desired patterns and vulcanized, produce tiles of the peculiar softness and nature herein described.

THOS. J. MAYALL.

Witnesses:
JOSEPH GAVETT,
ALBERT W. BROWN.